(12) United States Patent
Yamane

(10) Patent No.: US 7,011,459 B2
(45) Date of Patent: Mar. 14, 2006

(54) CAMERA WITH SLIDABLE COVER

(75) Inventor: Kenji Yamane, Saitama (JP)

(73) Assignee: Fujinon Corporation, Saitama (JP)

( * ) Notice: Subject to any disclaimer, the term of this patent is extended or adjusted under 35 U.S.C. 154(b) by 134 days.

(21) Appl. No.: 10/805,313

(22) Filed: Mar. 22, 2004

(65) Prior Publication Data

US 2004/0190892 A1  Sep. 30, 2004

(30) Foreign Application Priority Data

Mar. 24, 2003  (JP) ............................. 2003-081241

(51) Int. Cl.
    *G03B 17/04*  (2006.01)
(52) U.S. Cl. ...................... 396/349; 396/448
(58) Field of Classification Search ............... 396/349, 396/448
    See application file for complete search history.

(56) References Cited

U.S. PATENT DOCUMENTS

| | | | | |
|---|---|---|---|---|
| 5,708,884 A | * | 1/1998 | Morishita | 396/349 |
| 5,950,028 A | * | 9/1999 | Ito | 396/349 |
| 5,980,121 A | * | 11/1999 | Fujisaki | 396/349 |
| 6,314,244 B1 | | 11/2001 | Manabe et al. | 396/175 |
| 6,374,051 B1 | | 4/2002 | Yamane | 396/177 |
| 6,450,708 B1 | * | 9/2002 | Takanashi | 396/448 |
| 6,715,938 B1 | * | 4/2004 | Takanashi | 396/349 |
| 6,926,453 B1 | * | 8/2005 | Hisamatsu | 396/349 |
| 2004/0190891 A1 | * | 9/2004 | Yamane | 396/349 |

FOREIGN PATENT DOCUMENTS

| | | |
|---|---|---|
| JP | 01-255839 | 10/1989 |
| JP | 2001-166362 | 6/2001 |

* cited by examiner

*Primary Examiner*—W. B. Perkey
(74) *Attorney, Agent, or Firm*—Young & Thompson

(57) ABSTRACT

In a camera, a movable lens barrel is movable between a collapsed position and photographing positions determined in front of the collapsed position. A slidable cover is movable, covers a front of the movable lens barrel when in a closed position, and uncovers the front of the movable lens barrel when in an open position. A cover stopper is movable, and retains the slidable cover in the open position when in a stopping position, and allows the slidable cover to move to the closed position when in a releasing position. A locking projection shifts in response to shifting of the movable lens barrel, retains the cover stopper in the stopping position when the movable lens barrel is in a photographing position, and allows the cover stopper to move from the stopping position to the releasing position when the movable lens barrel is in the collapsed position.

10 Claims, 11 Drawing Sheets

CAMERA WITH SLIDABLE COVER

BACKGROUND OF THE INVENTION

1. Field of the Invention

The present invention relates to a camera with a slidable cover. More particularly, the present invention relates to a camera with an improved structure relevant to a slidable cover for protecting a front of a movable lens barrel.

2. Description Related to the Prior Art

There is a camera in which a movable lens barrel can be collapsed inside a camera body. This structure is effective in portability in manual handling because of its small size. Also, a camera having a slidable cover in the front of the camera is known. The slidable cover is movable in front of the movable lens barrel in a horizontal direction across the optical axis, and protects the front of the movable lens barrel.

There have been various suggestions for protecting the movable lens barrel by locking the slidable cover before the complete collapsing of the movable lens barrel in the camera having the movable lens barrel of the collapsible type. For instance, JP-A 1-255839 discloses a structure in which a stopper is disposed in a movable manner into and out of a moving locus of a projection protruding from the rear of the slidable cover in response to the rotational movement of the movable lens barrel. Also, U.S. Pat. No. 5,950,028 (corresponding to JP-A 10-171001) discloses another form of the stopper movable in an optical axis direction in response to movement of the movable lens barrel in the parallel direction. An end of the stopper is engaged with the slidable cover for locking.

For the purpose of great ease in the manual operation, the slidable cover has a smoothly openable structure. It is likely that great external force is applied to the slidable cover. The stopper must have a sufficient strength resistant to the force to the slidable cover because of locking of the slidable cover. In the known structures of the prior art, the stopper is produced from expensive metal with considerable hardness for the purpose of obtaining high strength. Furthermore, it has been suggested that a portion of the stopper receiving force from the slidable cover is separate from mechanical portions for transmission. Thus, a product of the camera is likely to be very costly, which is inconsistent to reduction of the size for the purpose of lowering a manufacturing cost.

SUMMARY OF THE INVENTION

In view of the foregoing problems, an object of the present invention is to provide a camera with an improved structure capable of allowing easy and smooth movement of a slidable cover for protecting a front of a movable lens barrel.

In order to achieve the above and other objects and advantages of this invention, a camera includes a movable lens barrel, movable between a collapsed position of being contained inside a camera body, and at least one photographing position determined in front of the collapsed position, for holding a taking lens. A slidable cover is movable between a closed position and an open position, for covering a front of the movable lens barrel when in the closed position, and for uncovering the front of the movable lens barrel when in the open position. A cover stopper is movable between a stopping position and a releasing position, for retaining the slidable cover in the open position when in the stopping position, and for allowing the slidable cover to move from the open position to the closed position when in the releasing position. A locking mechanism shifts in response to shifting of the movable lens barrel, retains the cover stopper in the stopping position when the movable lens barrel is in the at least one photographing position, and allows the cover stopper to move from the stopping position to the releasing position when the movable lens barrel is in the collapsed position.

The locking mechanism, in response to setting of the slidable cover to the open position, becomes engaged tightly with the cover stopper, to lock the cover stopper in the stopping position, and in response to setting of the slidable cover to the closed position, becomes disengaged from the cover stopper in the stopping position, to allow backward shifting of the cover stopper to the releasing position.

Furthermore, a first switch is changed over in response to shifting of the slidable cover. An actuator moves the movable lens barrel in response to changing over of the first switch, and shifts the locking mechanism.

In other words, a first switch changes over from a first state to a second state upon movement of the slidable cover to the open position. A motor rotates forwards upon a change of the first switch from the first state to the second state, and rotates backwards upon a change of the first switch from the second state to the first state. A transmission gear mechanism transmits rotation of the motor to the movable lens barrel, to move the movable lens barrel from the collapsed position to the photographing position when the motor rotates forwards, and to move the movable lens barrel from the photographing position to the collapsed position when the motor rotates backwards.

Furthermore, a stopper biasing element biases the cover stopper toward the stopping position, to set the cover stopper therein. A pressing portion is provided in the slidable cover, for pressing the cover stopper toward the releasing position against the stopper biasing element when the slidable cover is in the closed position, to set the cover stopper therein.

Furthermore, a transmission gear mechanism connects the movable lens barrel with the actuator, and moves the movable lens barrel to the at least one photographing position in response to motion generated in a predetermined direction by the actuator.

Furthermore, a locking recess is formed in the slidable cover, for retaining the cover stopper in the stopping position when the slidable cover is in the open position.

The releasing position of the cover stopper is defined behind the stopping position thereof, the pressing portion is opposed to a stopper front end of the cover stopper when in the closed position, and the locking recess receives the stopper front end when in the open position.

The locking mechanism includes a transmission ring rotated by the transmission gear mechanism. A locking projection is formed to protrude from the transmission ring.

The locking projection is movable along a front surface of the camera body.

Furthermore, a biasing element transmits the motion from the transmission gear mechanism to the locking mechanism by biasing the locking mechanism, to retain the cover stopper in the stopping position.

Furthermore, a stationary barrel has a front edge portion protruding from a front of the camera body, for supporting the movable lens barrel movably in forward and backward directions. The transmission ring is secured to an outside of the movable barrel in a rotatable manner.

The at least one photographing position comprises a wide-angle position, and a telephoto position defined in front of the wide-angle position. The transmission gear mechanism includes a ring-shaped gear, concentric with the transmission ring, for being rotated by the actuator. The transmission ring is engaged with and rotated by the ring-shaped gear while the movable lens barrel moves between the collapsed position and the wide-angle position, for moving the flash emitting unit.

The cover stopper is rotatable about an axis. The pressing portion of the slidable cover, when set in the open position, is away from a front of the cover stopper, and allows the stopper biasing element to rotate the cover stopper from the releasing position, the cover stopper being retained in the stopping position by the locking recess. The slidable cover, when set in the closed position, presses and rotates the cover stopper from the stopping position with the pressing portion, the cover stopper being in the releasing position and pressing the locking mechanism, for locking the locking mechanism in an initial state.

Furthermore, a first inclined surface of the locking mechanism is opposed to the cover stopper, and inclined relative to a moving direction thereof. A second inclined surface of the cover stopper is inclined relative to the moving direction, for pressing the first inclined surface with the cover stopper in the releasing position when the slidable cover is in the closed position, for locking the locking mechanism in an initial state.

Furthermore, a rear locking face of the cover stopper is opposed to the locking mechanism. A front locking face of the locking mechanism presses the rear locking face when the slidable cover is in the open position, to lock the cover stopper in the stopping position.

Furthermore, a front cover is secured to a front of the camera body, for supporting a rear of the slidable cover movably, the front cover being disposed in front of the cover stopper. An opening is formed in the front cover, for receiving entry of a front portion of the cover stopper.

Furthermore, a slide supporting mechanism has at least one straight portion, for securing the slidable cover to the front cover in a slidable manner.

The slide supporting mechanism includes a projection formed to project from the slidable cover. A rail groove is formed in the front cover, for receiving the projection, to keep the slidable cover slidable.

Furthermore, a flash emitting unit is movable between a contained position and a flashing position, positioned inside the camera body when in the contained position, and positioned to protrude from the camera body when in the flashing position, for applying flash light to a photographic field. A flash shifter moves the flash emitting unit to the flashing position in response to the motion from the locking mechanism.

The transmission ring moves the flash emitting unit in response to rotation of the transmission gear mechanism. Furthermore, a changer mechanism is set in a first set position when the slidable cover is in the closed position, and set in a second set position when the slidable cover is in the open position, the changer mechanism, when in the first set position, unlinking the transmission ring from the transmission gear mechanism, and when in the second set position, linking the transmission ring with the transmission gear mechanism.

Furthermore, a biasing element biases the flash emitting unit toward the contained position.

The changer mechanism is constituted by the cover stopper.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1A:
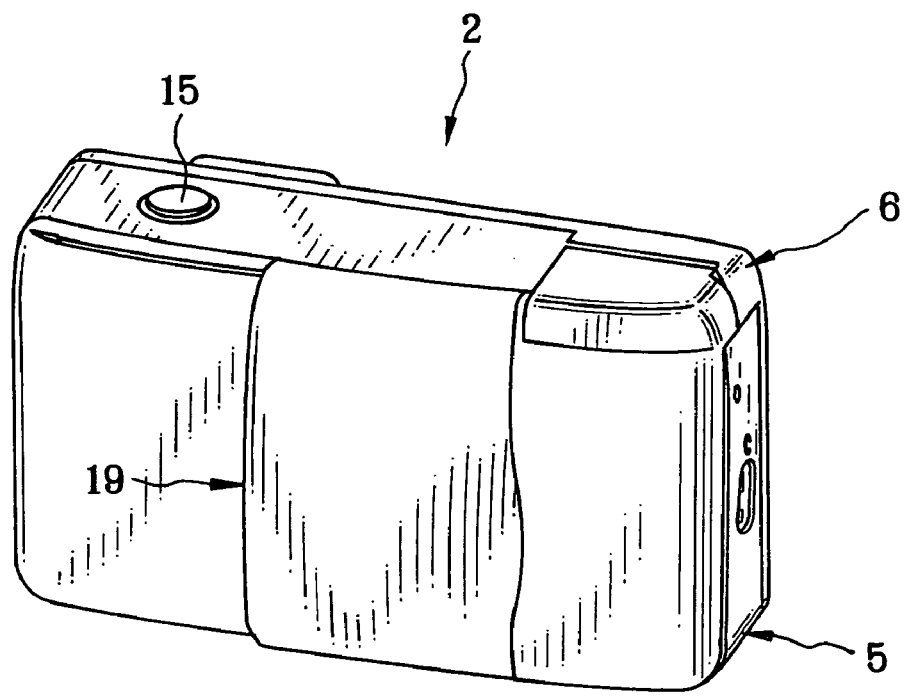
FIG. 1A is a perspective illustrating a flash built-in camera of which a slidable cover is closed.
Figure 1B:
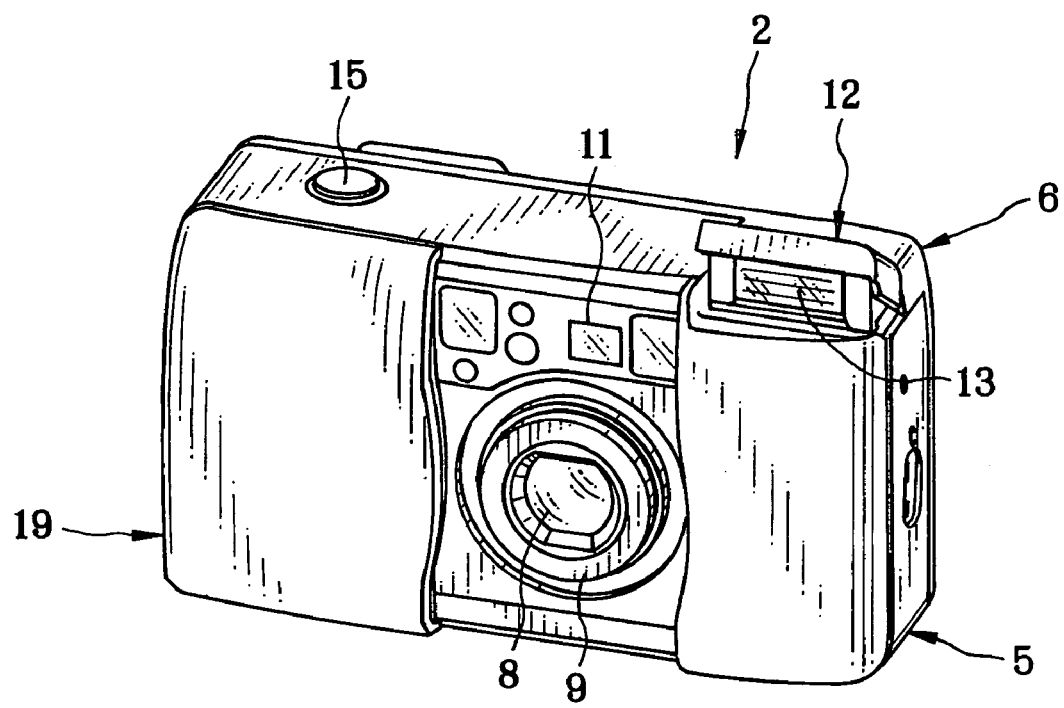
FIG. 1B is a perspective illustrating a state of the camera with the slidable cover in an open position.

In FIGS. 1A and 1B, a flash built-in camera 2 of the invention is illustrated. The camera 2 is a compact type for use with a 135 photo film cassette, and includes a camera body 4, a front cover 5 and a rear cover 6. The camera body 4 includes various elements for the purpose of taking exposures. See FIG. 2. The front and rear covers 5 and 6 are fitted on the camera body 4 to cover the same. Most of the elements or parts in the camera 2 are plastic parts. However, partial elements are metallic as required for mechanical strength, electrical conductivity or the like.

A movable lens barrel 9 is incorporated in the center of the camera 2, and includes a taking lens 8 or zoom optical system, a shutter and an aperture stop mechanism. The movable lens barrel 9 is movable between a collapsed position, a wide-angle end position and a telephoto end position. The movable lens barrel 9 is contained in the camera 2 when in the collapsed position. The movable lens barrel 9, when the power source for the camera 2 is turned on, is moved in a forward direction to come to the wide-angle end position. Also, the movable lens barrel 9 is further moved in the forward direction to come to the telephoto end position defined in front of the wide-angle end position.

A viewfinder objective window 11 is disposed higher than the movable lens barrel 9. Various windows are disposed near to the viewfinder objective window 11, including a rangefinding window for projecting light, a rangefinding window for receiving the light, a photometric window, and a self-timer window for emitting signaling light. A flip-up flash device 12 includes a flip-up flash emitting unit, which is incorporated in the camera 2 at one upper corner. There is a flashing surface 13 of the flash emitting unit directed toward the outside. The flash emitting unit is rotationally shiftable between a contained position and a flashing position, and when in the contained position, keeps the flashing surface 13 contained in the camera 2, and when in the flashing position, sets the flashing surface 13 directed to a field or object to be photographed.

A shutter release button 15 is disposed in an upper panel of the camera 2. The rear (not shown) of the camera 2 is provided with a viewfinder eyepiece window, and a zoom button for moving the movable lens barrel 9 between the wide-angle and telephoto end positions back or forth, and for moving the movable lens barrel 9 backwards to the collapsed position.

A slidable cover 19 is secured to the front of the front cover 5, and slidable to the right and left between a closed position and an open position, and when in the closed position, covers the front of the movable lens barrel 9, and when in the open position, uncovers the front of the movable lens barrel 9. The rear cover 6 is also provided with a rear lid and a battery lid. The rear lid openably closes a cassette loading chamber, a roll chamber, and an exposure aperture in between. The battery lid openably closes a battery chamber.

Figure 2:
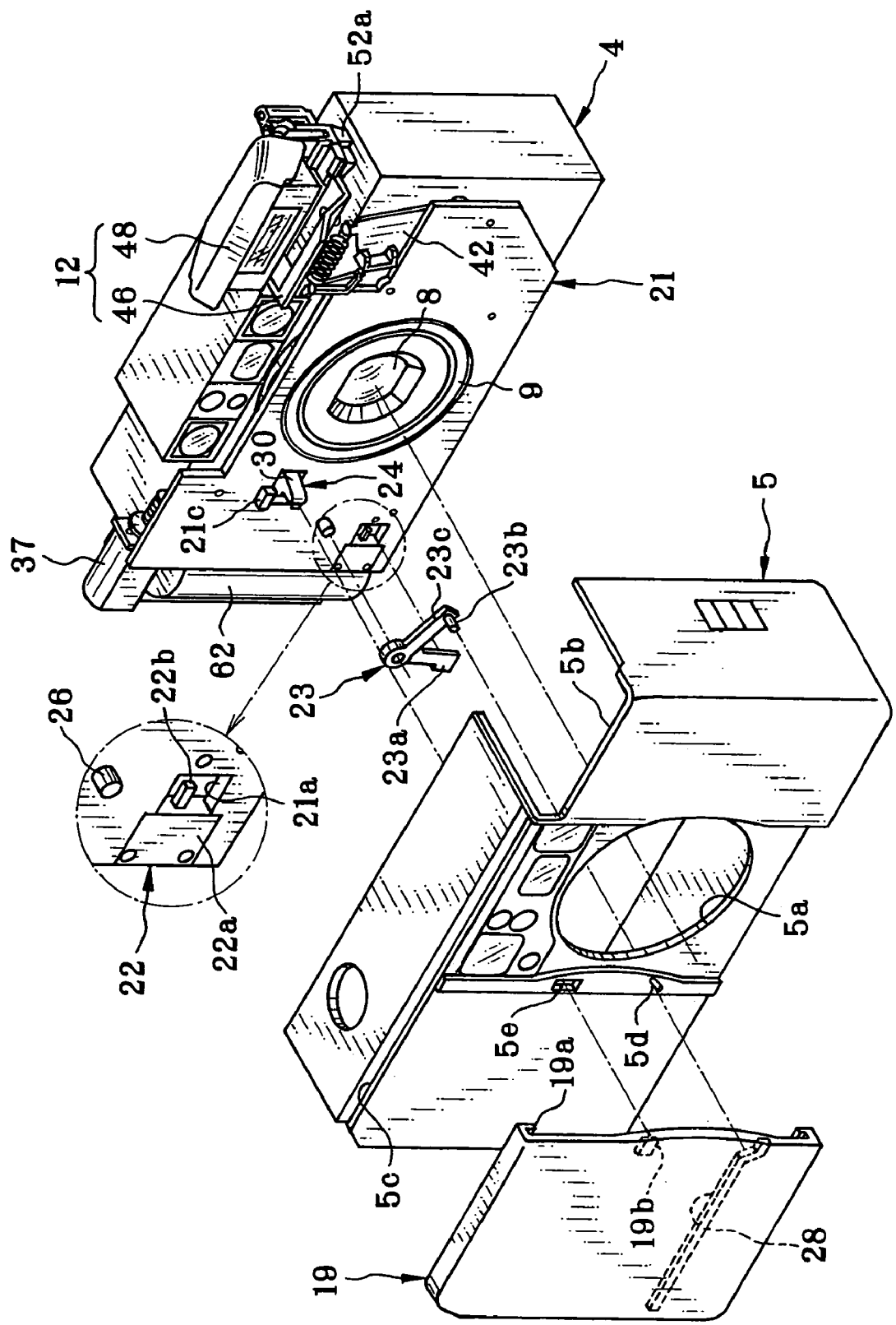
FIG. 2 is an exploded perspective illustrating a camera body, a front cover and the slidable cover.

In FIG. 2, a state of disassembly of the camera body 4, the front cover 5 and the slidable cover 19 is disposed in a perspective. A circular opening 5a is formed in the front cover 5 for insertion of the movable lens barrel 9. An upper cutout 5b is formed in the front cover 5 for receiving positioning of the flip-up flash device 12. Also, a rail groove 5c is formed in each of upper and lower edge portions of the front cover 5, and extends horizontally. A ridge 19a protrudes from each of upper and lower edges of the slidable cover 19, and is received in the rail groove 5c.

An inner cover panel 21 is secured to the front of the camera body 4, and keeps various elements set on the camera body 4. On the inner cover panel 21 are mounted a first switch 22 or power switch 22, a switch lever 23, and a changer mechanism 24 as cover stopper. The first switch 22 turns on and off power for the camera 2. The switch lever 23 transmits motion of the slidable cover 19 to the first switch 22 for switching operation. The changer mechanism 24 regulates a range of sliding of the slidable cover 19.

The first switch 22 is a depressible type, and includes a switch body 22a and a pushbutton element 22b, which is movable into and out of an inside space of the switch body 22a, to turn on and off the power. A support pin 26 is disposed close to the first switch 22, and supports the switch lever 23 in a rotatable manner. The switch lever 23 includes a switching arm 23a and a linking arm 23c. The switching arm 23a is inserted in an opening 21a in the inner cover panel 21, to depress the pushbutton element 22b, or to release the pushbutton element 22b from the depression. The linking arm 23c has a linking pin 23b. A slot 5d is formed in the front portion of the front cover 5. A linking groove 28 is formed in a rear face of the slidable cover 19 to extend horizontally. The linking pin 23b is inserted in the slot 5d and in the linking groove 28. Note that the linking groove 28 has a shape including an end bent portion directed downwards near a lateral edge of the slidable cover 19.

The linking pin 23b of the switch lever 23 is located in a range of the horizontal portion of the linking groove 28 when the slidable cover 19 is in the closed position and between the closed position and a point slightly short of the open position. While the linking pin 23b is in the horizontal range of the linking groove 28, the power for the camera 2 is kept turned off, because the switching arm 23a does not depress the pushbutton element 22b of the first switch 22. When the slidable cover 19 is slid to the open position, the linking pin 23b moves along the end bent portion of the linking groove 28, to cause the switch lever 23 to rotate in the clockwise direction. During this rotation, the switching arm 23a depresses the pushbutton element 22b of the first switch 22, to turn on the power source for the camera 2.

Figure 3:
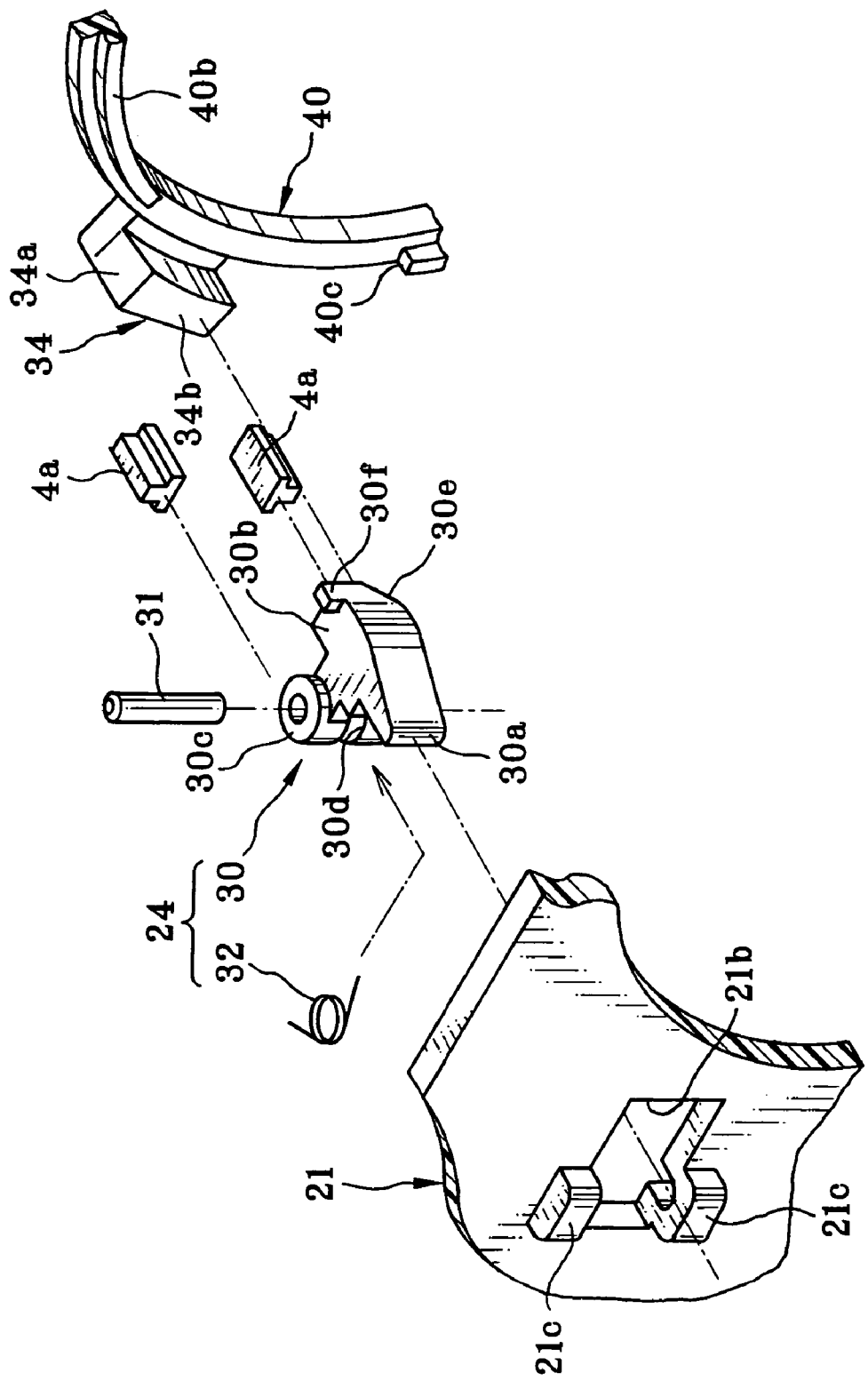
FIG. 3 is an exploded perspective illustrating a cover stopper.
Figure 4A:
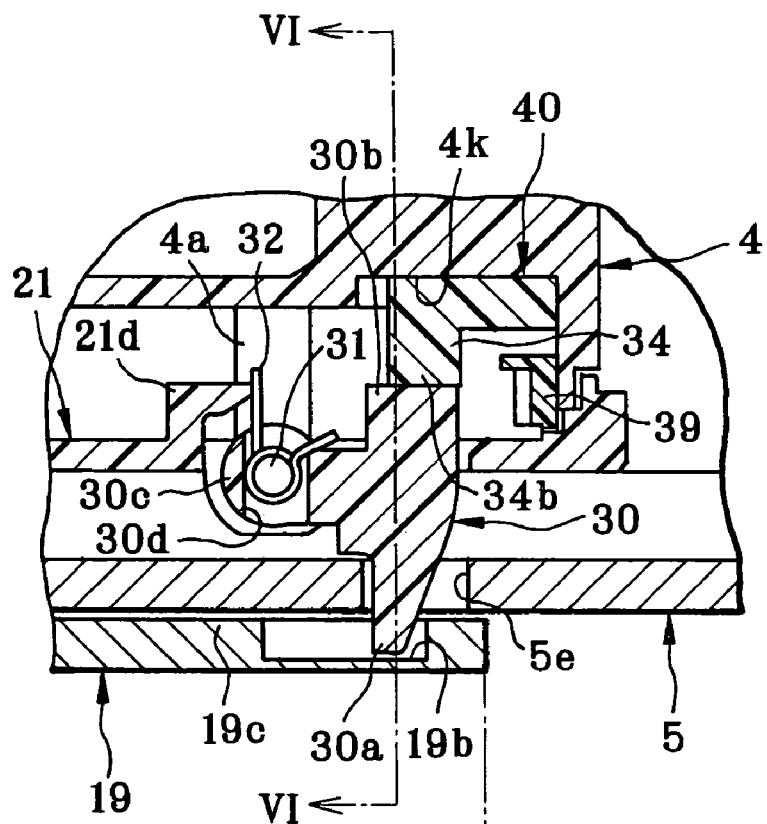
FIG. 4A is a section illustrating elements near to the cover stopper with the slidable cover in the open position.

In FIG. 3, the changer mechanism 24 is illustrated. In FIG. 4A, the state of the same is illustrated in a section for the slidable cover 19 in the open position. The changer mechanism 24 includes a cover stopper 30, a rotational shaft 31 and a stopper biasing spring 32 that is a torsion coil spring. The cover stopper 30 is formed from a plastic material. The shaft 31 is an element of metal. A stopper front end 30a of the cover stopper 30 has a decreasing size in a direction toward the front of the camera. A stopper rear end of the cover stopper 30 has a flat rear locking face 30b that is parallel to a front surface of the camera. Thus, the entirety of the cover stopper 30 is in a wedge shape. One surface of the cover stopper 30 is erect, where a cylindrical sleeve portion 30c for insertion is formed with the cover stopper 30, and receives insertion of the shaft 31. A cutout 30d is formed in the middle of the sleeve portion 30c, and receives insertion of the stopper biasing spring 32. The insertion of the shaft 31 exactly positions the stopper biasing spring 32 in the sleeve portion 30c.

The inner cover panel 21 includes an opening 21b, bearing portions 21c and a support portion 21d. The opening 21b receives insertion of the stopper front end 30a of the cover stopper 30. The bearing portions 21c receive both ends of the shaft 31 protruding from end faces of the sleeve portion 30c. The support portion 21d in FIGS. 4A and 5 supports the rear of the sleeve portion 30c for keeping the cover stopper 30 on the inner cover panel 21 without a drop. A pair of support projections 4a are formed with a front of the camera body 4, for supporting both ends of the shaft 31 from behind the same.

Figure 5:
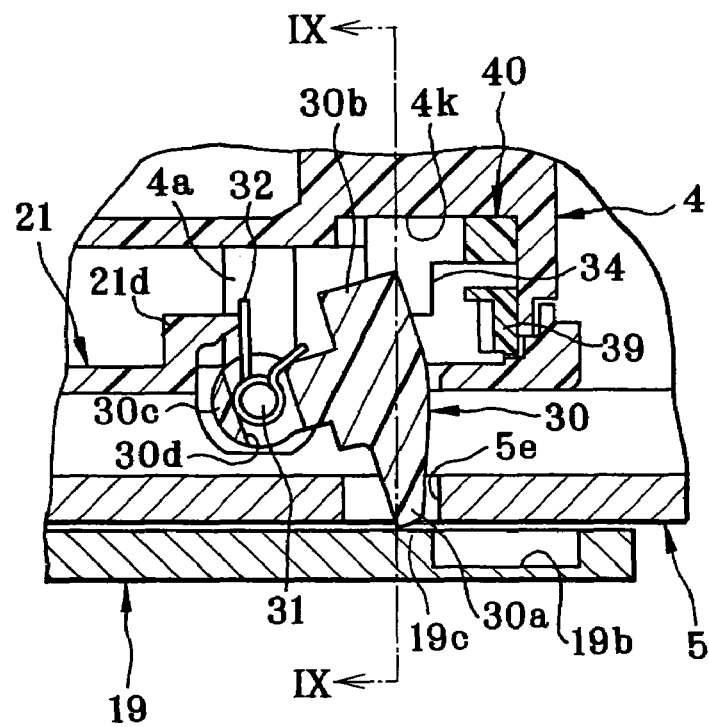
FIG. 5 is a section illustrating elements around the cover stopper in sliding of the slidable cover to the closed position.

An opening 5e is formed in the front cover 5. The stopper front end 30a of the cover stopper 30 is inserted in the opening 5e, and contacts a rear face of the slidable cover 19. A locking recess 19b is formed in the rear of the slidable cover 19, and opposed to the cover stopper 30 when the slidable cover 19 is in the open position, to receive insertion of the stopper front end 30a. In FIG. 5, the cover stopper 30 is rotationally shiftable between a stopping position and a releasing position, and when in the stopping position, causes the stopper front end 30a to protrude over the front of the front cover 5, and when in the releasing position, keeps the stopper front end 30a inside the front cover 5. The stopper biasing spring 32 biases the cover stopper 30 toward the stopping position.

Figure 6:
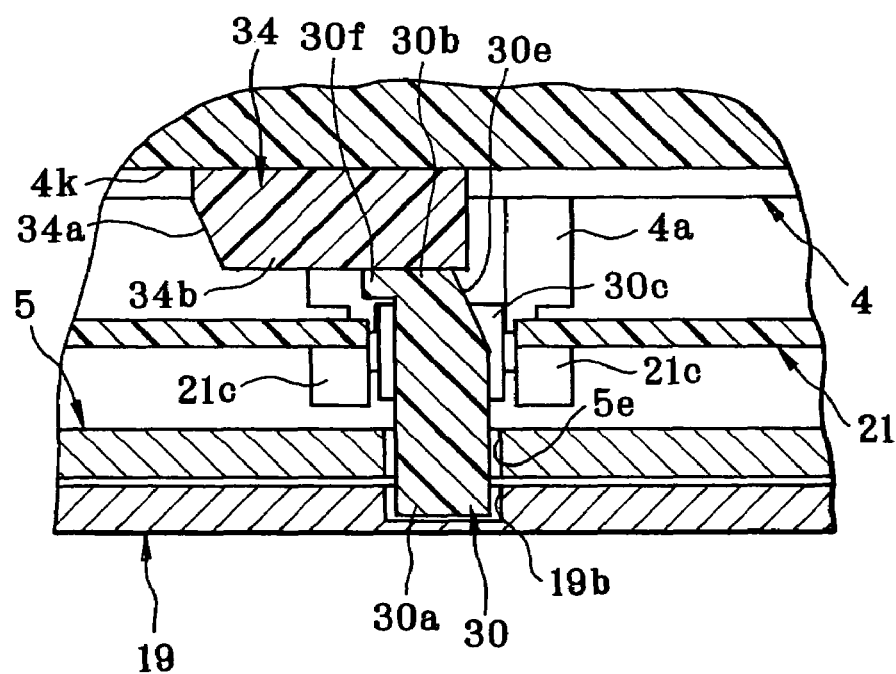
FIG. 6 is a section taken on line VI—VI in FIG. 4A.
Figure 7A:
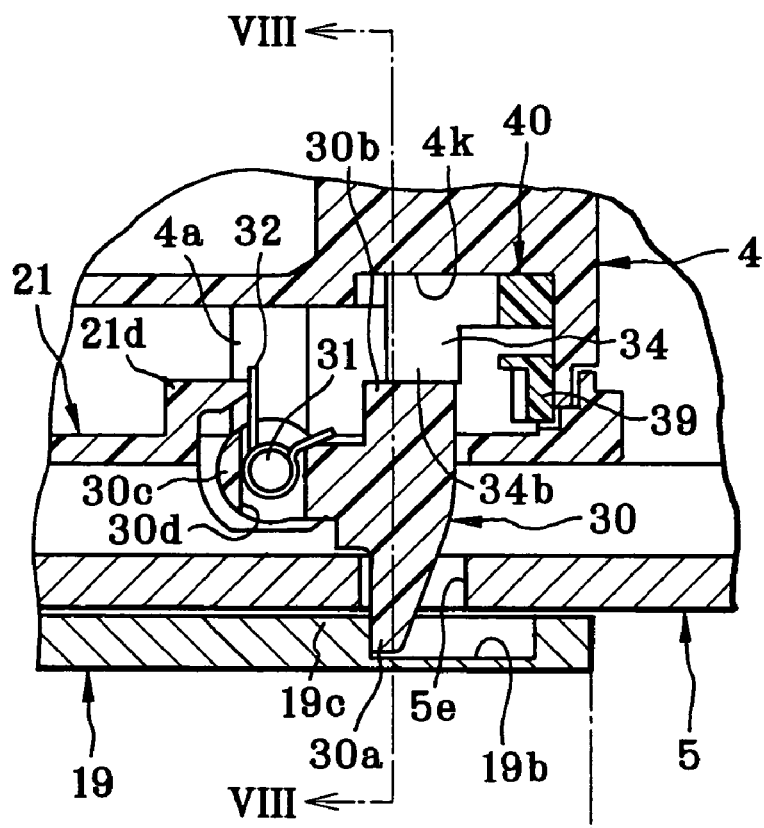
FIG. 7A is a section illustrating the element around the cover stopper in locking the slidable cover.
Figure 8:
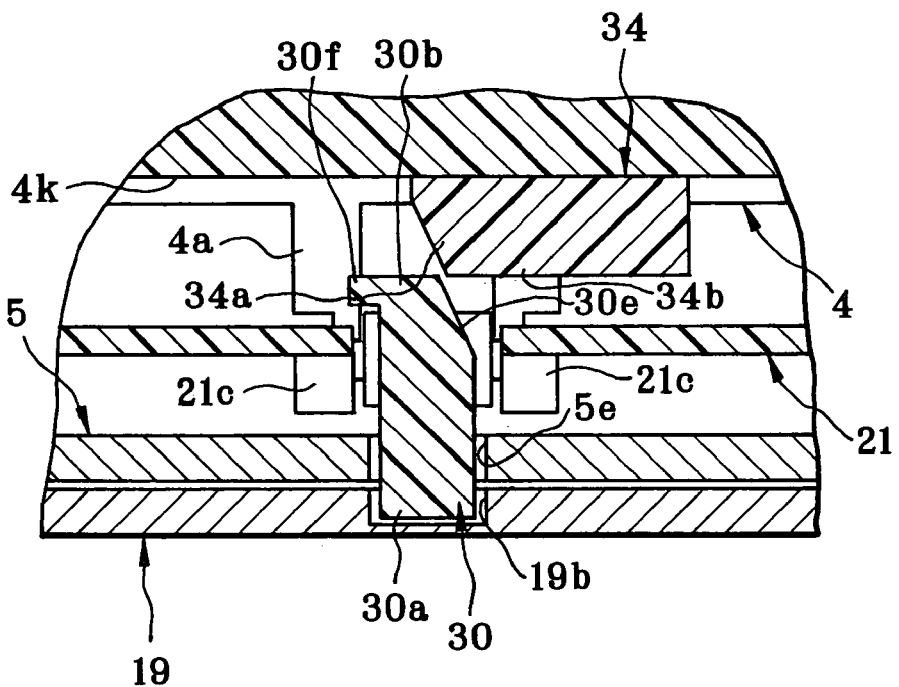
FIG. 8 is a section taken on line VIII—VIII in FIG. 7A.

A locking projection 34 as locking mechanism protrudes from a transmission ring 40 as ring-shaped member, is disposed behind the cover stopper 30, and is movable into and out of a space between the camera body 4 and the rear locking face 30b of the cover stopper 30. FIG. 6 is a section taken on line VI—VI in FIG. 4A. While the movable lens barrel 9 is set in a certain photographing position between the wide-angle and telephoto end positions, a front locking face 34b of the locking projection 34 contacts the rear locking face 30b to block rotation of the cover stopper 30 toward the releasing position. In FIG. 7A, if force for sliding is applied to the slidable cover 19 toward the closed position with the movable lens barrel 9 set in one photographing position, the stopper front end 30a of the cover stopper 30 is engaged with the locking recess 19b, and prevents the slidable cover 19 from sliding further than this state. FIG. 8 is a section taken on line VIII—VIII in FIG. 7A. When the movable lens barrel 9 is collapsed entirely, the locking projection 34 moves away from behind the cover stopper 30, and allows the cover stopper 30 to rotate toward the releasing position.

Therefore, it is possible to prevent incidental sliding of the slidable cover 19 by using the cover stopper 30 or the locking projection 34 having a comparatively small size, because rotation of the cover stopper 30 is blocked by the locking projection 34 in engagement with the slidable cover 19. Also, the force applied to the locking projection 34 is received by a panel surface of the camera body 4 with a large area. It is possible to use a plastic material for forming the cover stopper 30 and the locking projection 34 without using metal, because no remarkably high rigidity of metallic parts is necessary.

Figure 9:
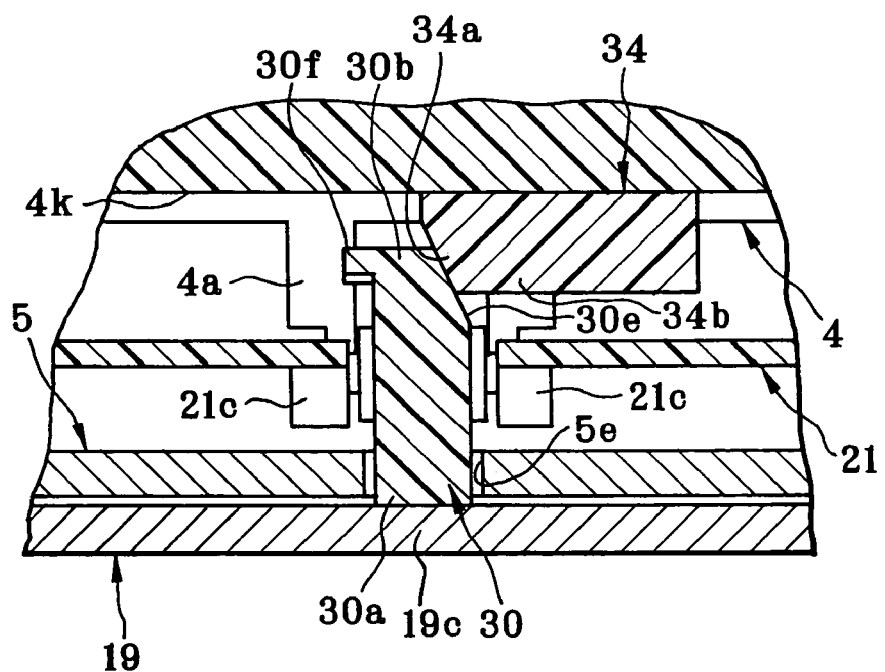
FIG. 9 is a section taken on line IX—IX in FIG. 5.

A first inclined face 34a is provided on the locking projection 34. A second inclined face 30e is provided on the cover stopper 30. FIG. 9 is a section taken on line IX—IX in FIG. 5. When the cover stopper 30 is rotated to the releasing position, the second inclined face 30e pushes the first inclined face 34a of the locking projection 34, to move the locking projection 34 in the forward direction as viewed from the cover stopper 30. A projection 30f of the cover stopper 30 is effective in stabilizing the contact between the cover stopper 30 and the locking projection 34 without enlarging the size of the cover stopper 30.

Figure 10:
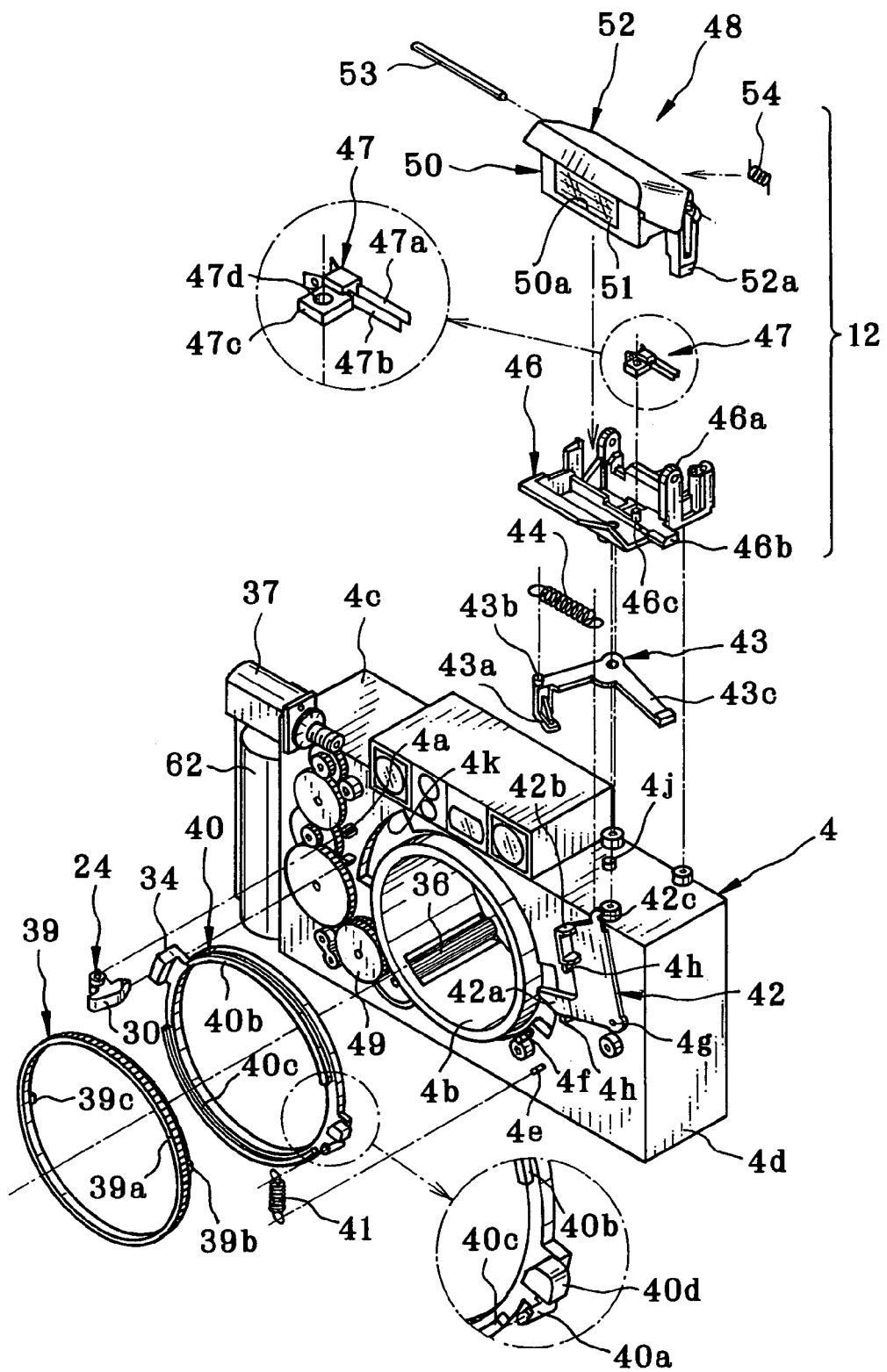
FIG. 10 is an exploded perspective illustrating portions of elements to be secured on the camera body.

In FIG. 10, a state of the camera body 4 from which the inner cover panel 21 is removed is illustrated. The camera body 4 includes a stationary barrel 4b, a cassette loading chamber 4c for a photo film cassette, and a roll chamber 4d for the photo film. The stationary barrel 4b supports the movable lens barrel 9 in a movable manner. The cassette loading chamber 4c and the roll chamber 4d are so disposed that the stationary barrel 4b lies between those. A long-size lens driving gear 36 in a transmission gear mechanism is contained in the stationary barrel 4b, for moving the movable lens barrel 9 between the collapsed position and photographing positions. A motor 37 as actuator is secured to an upper corner of the camera body 4. A set of plural gears are connected with the motor 37, disposed beside the stationary barrel 4b, and transmits rotation of the motor 37 to the lens driving gear 36 for moving the movable lens barrel 9.

To transmit rotation of the motor 37 to the flash emitting unit, elements for the transmission include a ring-shaped gear 39, a transmission ring 40, a tension coil spring 41, a first shift lever 42, a second shift lever 43 and a lever biasing spring 44 which is a tension coil spring. The transmission ring 40 and the ring-shaped gear 39 have such an inner diameter that those are rotatable about the stationary barrel 4b, and are mounted to the periphery of the stationary barrel 4b one after another. A ring-shaped recess 4k is formed in the camera body 4 about the stationary barrel 4b for receiving the transmission ring 40 in relation to the optical axis direction.

In the ring-shaped gear 39, a tooth train 39a is located thereabout. A gear 49 in the transmission gear mechanism is meshed with the tooth train 39a. When the motor 37 rotates, the ring-shaped gear 39 rotates together for moving the movable lens barrel 9 in the forward or backward direction. A first pressing projection 39b and a second pressing projection 39c project from a rear face of the ring-shaped gear 39. As viewed in a direction along an arc of the circular shape, the second pressing projection 39c is rotationally symmetrical with the first pressing projection 39b. However, the position of the second pressing projection 39c is determined at a greater radius than that of the position of the first pressing projection 39b.

Figure 11:
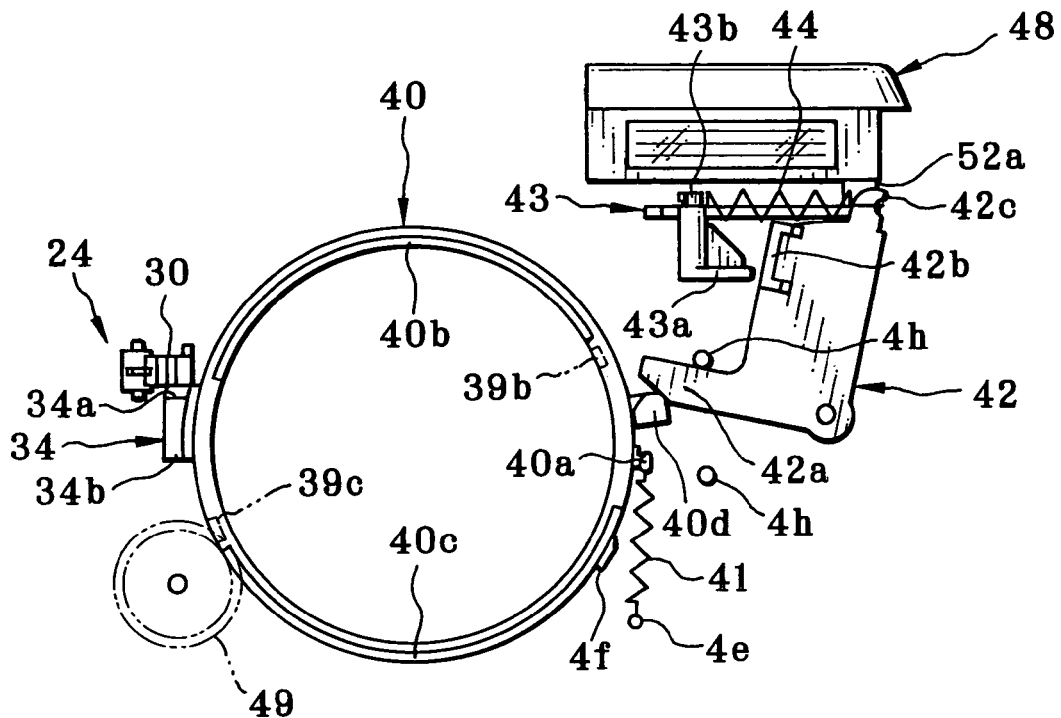
FIG. 11 is a front elevation illustrating elements in a not-photographing state, including a ring-shaped gear and a flip-up flash emitting unit.
Figure 12:
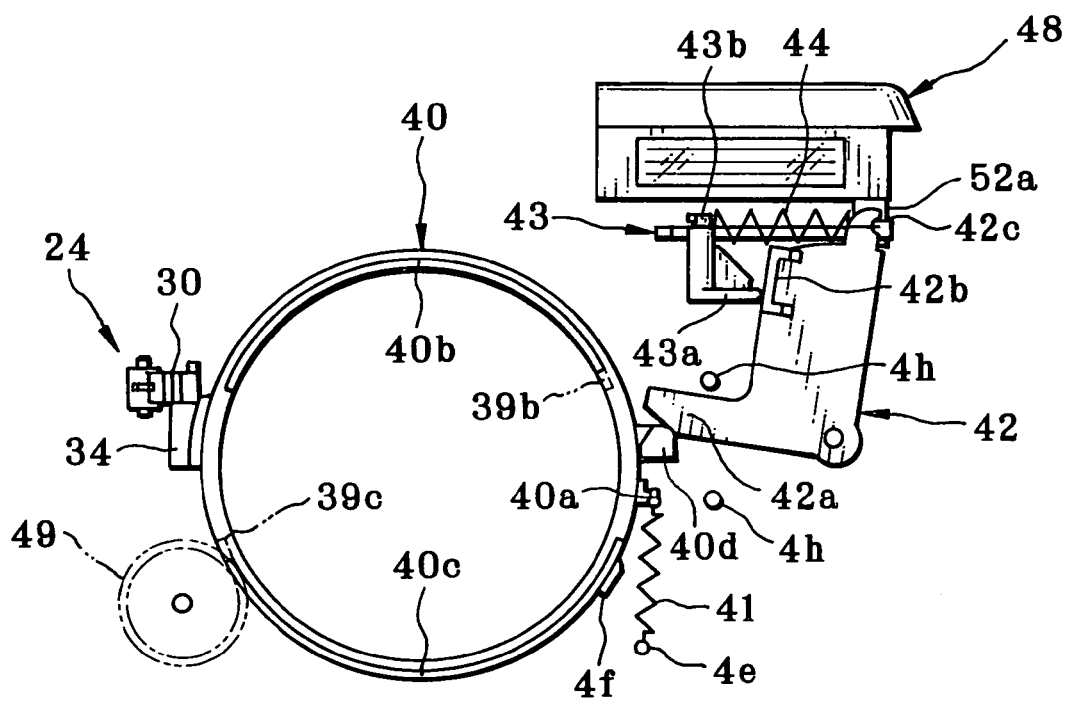
FIG. 12 is a front elevation illustrating the elements in a state immediately after opening the slidable cover.
Figure 13:
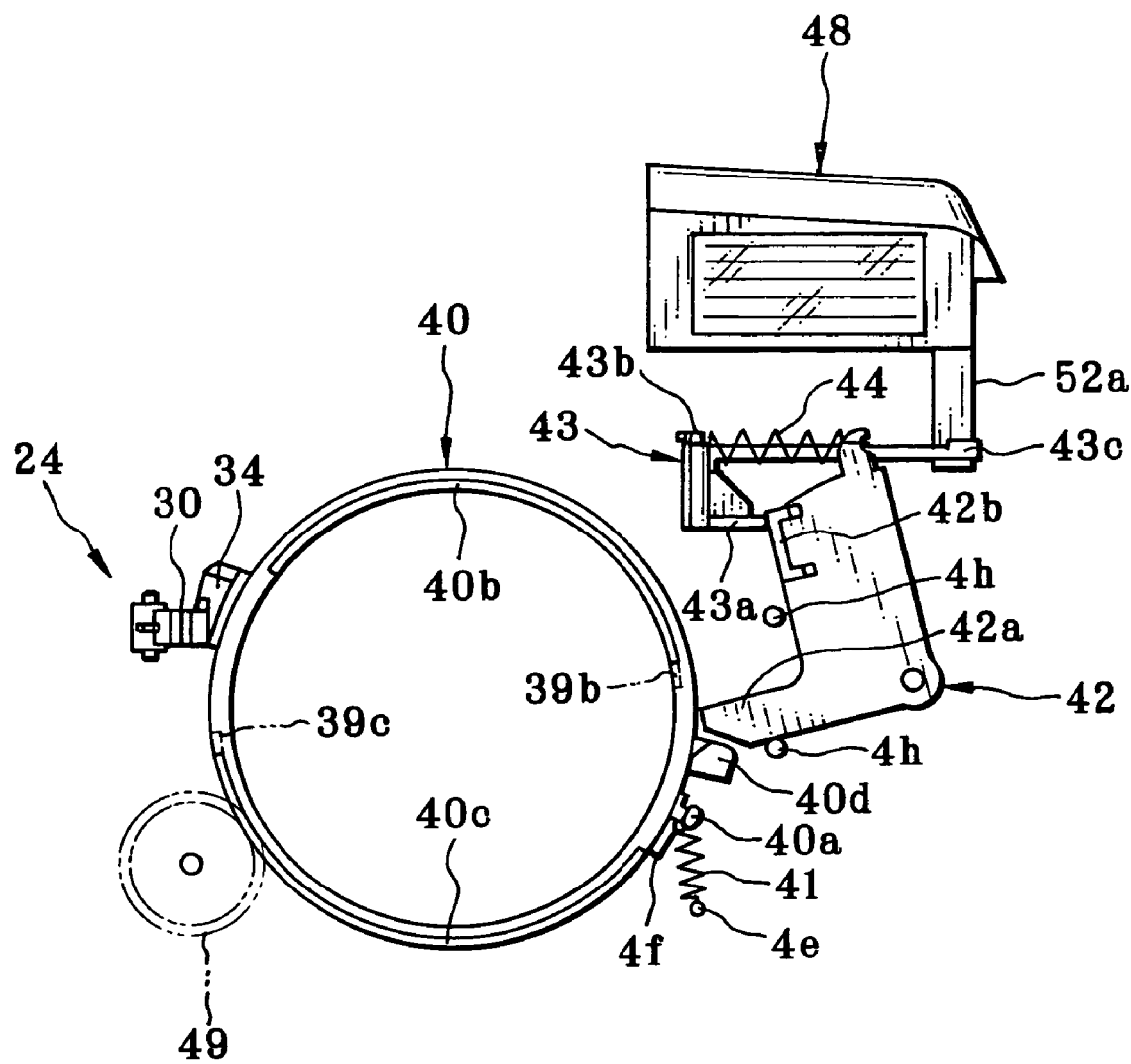
FIG. 13 is a front elevation illustrating the elements in a photographing state.

In FIGS. 11–13, a first engaging ridge 40b as a first engaging portion is formed on a front face of the transmission ring 40 for contact with the first pressing projection 39b of the ring-shaped gear 39. A second engaging ridge 40c as a second engaging portion is formed on the transmission ring 40 for contact with the second pressing projection 39c, and rotationally symmetrical with the first engaging ridge 40b. The first and second engaging ridges 40b and 40c are projections, but the position of the second engaging ridge 40c is determined at a greater radius than that of the position of the first engaging ridge 40b, in association with the difference in the radius between the first and second pressing projections 39b and 39c.

The periphery of the transmission ring 40 is provided with a retention pin 40a, a contact projection 40d and the locking projection 34 described heretofore. The retention pin 40a retains a spring end of the tension coil spring 41. The contact projection 40d contacts the first shift lever 42. A pin 4e protrudes from the front of the camera body 4, and retains a second spring end of the tension coil spring 41, which biases the transmission ring 40 in the clockwise direction. A regulating projection 4f is formed with the front of the camera body 4, contacts the retention pin 40a, and regulates a rotating range of the transmission ring 40 in relation to the clockwise direction.

The first shift lever 42 has approximately an L-shape. A pin 4g protrudes from the front of the camera body 4, and supports the first shift lever 42 in a rotatable manner. The first shift lever 42 includes a linking lever end arm 42a, a contacting lever end portion 42b and a retention pin 42c. The lever end arm 42a contacts the contact projection 40d of the transmission ring 40. The lever end portion 42b contacts the second shift lever 43. The retention pin 42c retains one spring end of the lever biasing spring 44. Regulating pins 4h protrude from the front of the camera body 4, contact the lever end arm 42a, and regulate a rotating amount of the first shift lever 42.

The second shift lever 43 has an L-shape. A pivotal pin 4j on an upper face of the camera body 4 supports the second shift lever 43 in a rotatable manner. The second shift lever 43 includes a contact or engaging end arm 43a, a retention pin 43b and a flash flip-up engaging end arm 43c. The engaging end arm 43a is located in front of the camera body 4, and contacts the lever end portion 42b of the first shift lever 42. The retention pin 43b retains a second spring end of the lever biasing spring 44. The engaging end arm 43c causes the flash emitting unit to rotate between the contained position and the flashing position.

The lever biasing spring 44 biases the first shift lever 42 in the counterclockwise direction, and biases the second shift lever 43 in the clockwise direction. A flash shifter is constituted by the first and second shift levers 42 and 43. When no load is applied to the first and second shift levers 42 and 43, then the first shift lever 42 makes a counterclockwise rotation, the second shift lever 43 making a clockwise rotation. So the lever end portion 42*b* contacts the engaging end arm 43*a*.

The flip-up flash device 12 includes a flash support panel 46, a detection switch 47 and a flash emitting unit 48. The flash support panel 46 is firmly secured to the camera body 4 and positioned to keep the second shift lever 43 rotatable without interference. The detection switch 47 is secured to the flash support panel 46. The flash emitting unit 48 is supported on the flash support panel 46 in a rotatable manner. The flash support panel 46 includes a couple of bearing portions 46*a* as rotational support mechanism, and a stopper pin 46*b*. The bearing portions 46*a* keep the flash emitting unit 48 rotatable. The stopper pin 46*b* prevents the flash emitting unit 48 from moving beyond the flashing position.

The detection switch 47 is constituted by elements including contact segments 47*a* and 47*b* of metal, and a contact segment holder 47*c* of a plastic material. A flash circuit 62 of FIG. 2 which includes a main capacitor, is connected with the contact segments 47*a* and 47*b*. The contact segment holder 47*c* holds the contact segments 47*a* and 47*b* in a state kept from contacting each other. A hole 47*d* is formed in the contact segment holder 47*c*. A pin 46*c* protrudes over an upper face of the flash support panel 46, is inserted in the hole 47*d* to keep the detection switch 47 fastened. When the contact segments 47*a* and 47*b* in the detection switch 47 are contacted by one another, the detection switch 47 is closed to enable the flash circuit 62 to emit flash light from the flash emitting unit 48.

The flash emitting unit 48 includes a light source holder 50, a cover panel 52, a rotational shaft 53 of metal as rotational support mechanism, and a flash flip-up spring 54 as torsion coil spring of metal. The light source holder 50 has a front opening 50*a* and a diffusing lens 51 or Fresnel lens. The front opening 50*a* is in a front portion of the light source holder 50. A flash discharge tube and a reflector are contained in the light source holder 50 behind the front opening 50*a*. The diffusing lens 51 is fitted in the front opening 50*a* of the light source holder 50 to constitute the flashing surface 13. The cover panel 52 is secured to an upper side of the light source holder 50, and comes to constitute an extension of the front cover 5 when the flash emitting unit 48 is set in the contained position rotationally. The shaft 53 is inserted in the bearing portions 46*a* of the flash support panel 46 and in a through hole of the cover panel 52, and sets the flash emitting unit 48 on the flash support panel 46 in a rotatable manner. The flash flip-up spring 54 is contained between the cover panel 52 and the light source holder 50, and biases the flash emitting unit 48 toward the flashing position.

Figure 14:
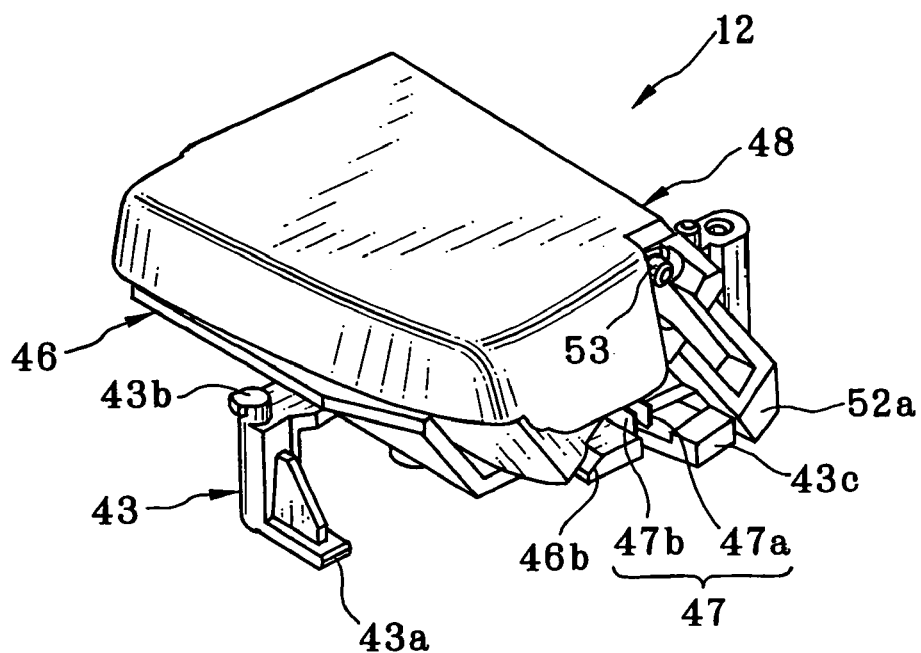
FIG. 14 is a perspective illustrating the flash emitting unit set in a contained position.
Figure 15:
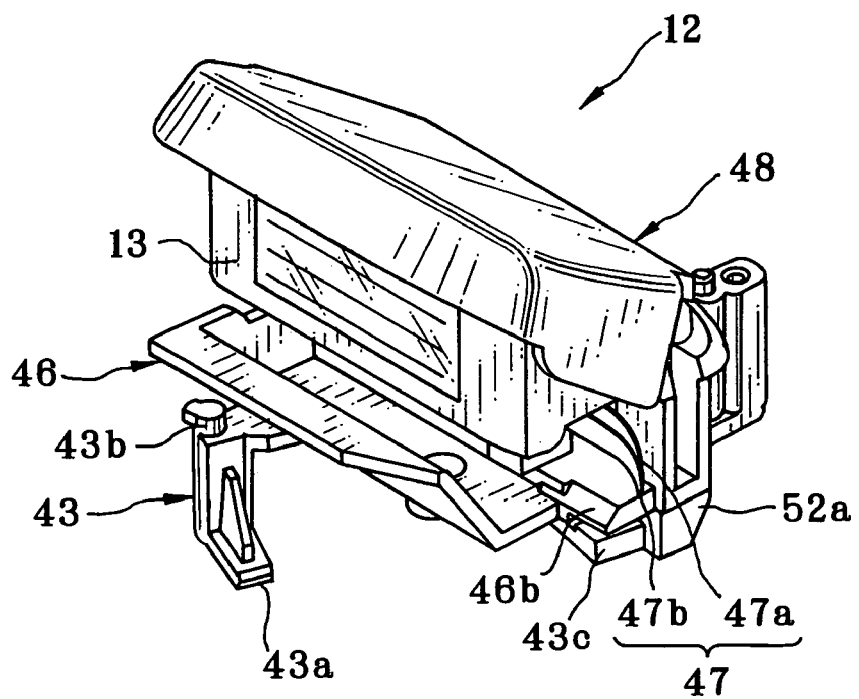
FIG. 15 is a perspective illustrating the flash emitting unit set in a flashing position.

In FIGS. 14 and 15, a lever projection 52*a* protrudes from the cover panel 52, to contact the engaging end arm 43*c* of the second shift lever 43. When the flash emitting unit 48 is rotationally shifted to the flashing position, the lever projection 52*a* contacts the stopper pin 46*b* of the flash support panel 46, to retain the flash emitting unit 48 in the flashing position. Also, when the flash emitting unit 48 is in the flashing position, the lever projection 52*a* presses the contact segment 47*a* of the detection switch 47, and causes the same to contact the contact segment 47*b*.

Figure 7B:
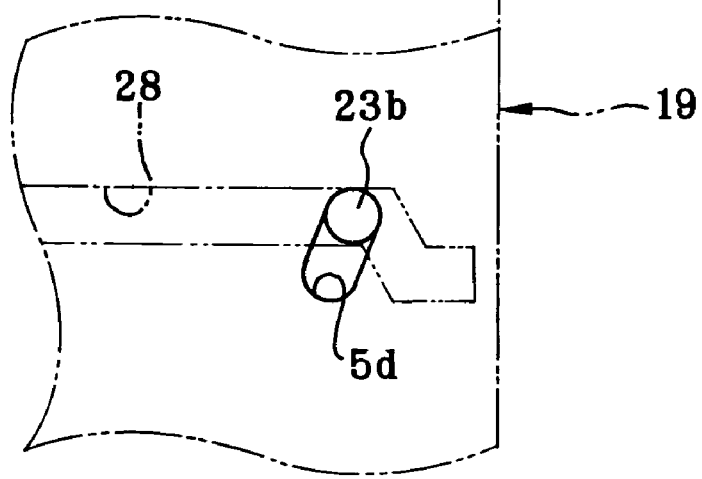
FIG. 7B is an explanatory view in plan, illustrating another state of the linking pin positioned at a point in the linking groove.

The operation of the above embodiment is described now. In FIG. 1A, the slidable cover 19 is set in the closed position when the camera 2 is not used. The slidable cover 19 is covering the movable lens barrel 9. In FIGS. 2 and 7B, the linking pin 23*b* of the switch lever 23 is positioned in the horizontal portion of the linking groove 28 of the slidable cover 19. The first switch 22 is kept turned off by the linking pin 23*b*.

In FIGS. 5 and 9, the cover stopper 30 is rotationally set in the releasing position because depressed by a rear pressing portion 19*c* of the slidable cover 19 while the power is turned off. The second inclined face 30*e* presses the first inclined face 34*a* of the locking projection 34, to set the transmission ring 40 rotationally in the counterclockwise direction in FIG. 11. In FIG. 11, the contact projection 40*d* of the transmission ring 40 pushes the lever end arm 42*a*, and rotationally sets the first shift lever 42 in the clockwise direction.

The first shift lever 42 causes the lever biasing spring 44 to pull the second shift lever 43. In FIG. 10, the second shift lever 43 is rotated in the counterclockwise direction. In FIG. 14, the engaging end arm 43*c* of the second shift lever 43 presses the lever projection 52*a* in the counterclockwise direction, to set the flash emitting unit 48 rotationally in the contained position.

While the power is turned off, the first shift lever 42 is positioned farther from the second shift lever 43 to overcharge the lever biasing spring 44. Thus, the flash emitting unit 48 can be kept in the contained position reliably. As the cover stopper 30 rotates the transmission ring 40, the first and second pressing projections 39*b* and 39*c* come away from respectively the first and second engaging ridges 40*b* and 40*c*. The ring-shaped gear 39 is unlinked from the transmission ring 40. Thus, the gears can be free from application of load with time even in connection with the tension coil spring 41 or the lever biasing spring 44, or the flash flip-up spring 54. The teeth of the gear can be protected from unwanted deformation with creep.

Figure 4B:
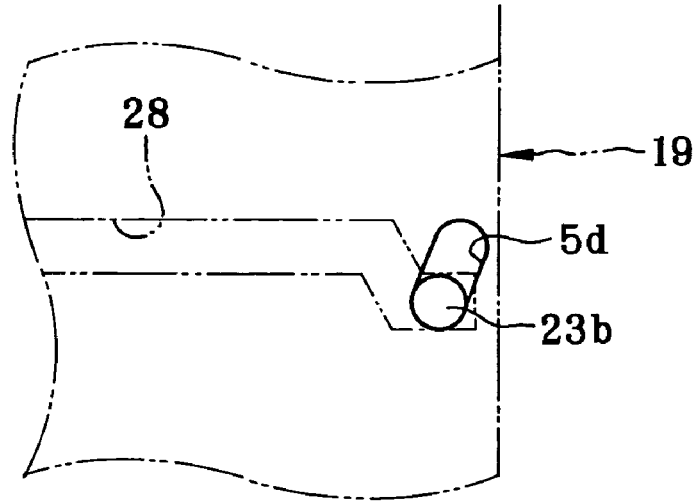
FIG. 4B is an explanatory view in plan, illustrating a state of a linking pin positioned at a point in a linking groove.

In FIG. 1B, the slidable cover 19 is slid to the open position. In FIG. 4B, the linking pin 23*b* is shifted to the end bent portion of the linking groove 28. The switch lever 23 makes a clockwise rotation in FIG. 2. It follows that the switching arm 23*a* depresses the pushbutton element 22*b* of the first switch 22, to turn on the power of the camera. In FIG. 4A, the cover stopper 30 is rotated by the stopper biasing spring 32 to the locked position, to insert the stopper front end 30*a* into the locking recess 19*b* of the slidable cover 19.

When the cover stopper 30 rotationally moves to the stopping position, the transmission ring 40 is caused by the tension coil spring 41 to rotate in the clockwise direction in FIG. 12. The first and second engaging ridges 40*b* and 40*c* are caused to contact the first and second pressing projections 39*b* and 39*c* of the ring-shaped gear 39.

When the power source for the camera 2 is turned on, the motor 37 rotates in the direction to move the movable lens barrel 9 forwards. Rotation of the motor 37 is transmitted to the lens driving gear 36 by the transmission gear mechanism having plural gears, to move the movable lens barrel 9 forwards with respect to the camera 2. Also, the rotation of the motor 37 is transmitted by the gear 49 to the ring-shaped gear 39, which rotates in the clockwise direction. In response to the clockwise rotation of the ring-shaped gear 39, the first and second engaging ridges 40*b* and 40*c* are released from depression with the first and second pressing projections 39*b* and 39*c*. The transmission ring 40, biased by the tension coil spring 41, rotates further in the clockwise direction.

In FIG. 13, the retention pin 40*a* rotates to a position for contacting the regulating projection 4*f*. In FIGS. 4A and 6, the locking projection 34 moves to the position between the camera body 4 and the cover stopper 30, to block rotation of the cover stopper 30 directed toward the releasing position. Thus, the slidable cover 19 is locked in the open position.

The first shift lever 42 is released from the depression with the contact projection 40d of the transmission ring 40. Thus, the first shift lever 42 is caused to make a counterclockwise rotation by the lever biasing spring 44, which causes the second shift lever 43 to make a clockwise rotation. The lever projection 52a is released from the depression with the engaging end arm 43c. In FIG. 15, the flash flip-up spring 54 causes the flash emitting unit 48 to rotate toward the flashing position. The lever projection 52a comes in contact with the stopper pin 46b of the flash support panel 46, firmly to set the flash emitting unit 48 in the flashing position.

The lever projection 52a of the flash emitting unit 48 rotationally set in the flashing position depresses the contact segment 47a of the detection switch 47, and causes the same to contact the contact segment 47b. Thus, a signal to enable the flash circuit 62 is output by the contact segment 47b. The setting of the flash emitting unit 48 in the flashing position is detected.

As described heretofore, the lever projection 52a in a single form is multi-functional, because of linking the flash emitting unit 48 with the second shift lever 43, setting the flash emitting unit 48 in the flashing position, and turning on and off of the detection switch 47. It is possible to prevent the unwanted enlargement of the flash emitting unit, and to determine points of the operation of the lever projection 52a with a sufficient distance from the rotational center of the flash emitting unit 48. Also in view of this, it is possible with the lever projection 52a to keep the precision high in the operation.

The lever projection 52a is kept unlinked from the second shift lever 43. If external force is applied to the flash emitting unit 48 incidentally toward the contained position, or if the switch for turning on the power is operated with force to the flash emitting unit 48 toward the contained position, there will occur no damages in the camera 2. If the flash emitting unit 48 is forcibly rotated toward the flashing position in the turned-off state of the power, the camera 2 can be still protected from being damaged, because rotation of the second shift lever 43 is absorbed by the lever biasing spring 44, and prevented from transmission to the first shift lever 42.

The ring-shaped gear 39 rotates also when the movable lens barrel 9 moves from the wide-angle end position to the telephoto end position. A ratio of the speed reduction of the gears is considerably great because of the great diameter of the ring-shaped gear 39. This is effective in keeping small a rotating amount of the ring-shaped gear 39. There is no incidental abutment of the first and second pressing projections 39b and 39c on faces opposite to the first and second engaging ridges 40b and 40c. The radius of the position of the first pressing projection 39b and the first engaging ridge 40b is different from the radius of the second pressing projection 39c and the second engaging ridge 40c. The transmission of force between the ring-shaped gear 39 and the transmission ring 40 according to couple of the force can be safe without abutment between the first pressing projection 39b and the second engaging ridge 40c.

After exposures are taken, the slidable cover 19 is slid to the closed position. The stopper front end 30a of the cover stopper 30 becomes engaged with the locking recess 19b. See FIG. 7A. The slidable cover 19 is kept from sliding. In FIG. 7B, the slidable cover 19 is being locked by the cover stopper 30. The linking pin 23b of the switch lever 23 is set in the horizontal portion of the linking groove 28. The power of the camera 2 is turned off while the slidable cover 19 is locked in the state without interference with the movable lens barrel 9. The movable lens barrel 9 is moved backwards for the collapse.

Most of the force applied in a direction to slide the slidable cover 19 toward the closed position is applied to the stopper front end 30a of the cover stopper 30. The cover stopper 30 can be free from breakage, because the stopper front end 30a has a sufficient thickness, and has a wedge shape with a substantially small length. The force to the cover stopper 30 is also transmitted to the locking projection 34 of the transmission ring 40. However, the transmission ring 40 does not break, because the force to the locking projection 34 is received behind by the ring-shaped recess 4k of the camera body 4. Furthermore, the rear locking face 30b of the cover stopper 30 and the front locking face 34b of the locking projection 34 are flat or very smooth. Rotation of the transmission ring 40 is prevented from being blocked even when the cover stopper 30 is pressed against the locking projection 34.

Rotation of the motor 37 is transmitted to the lens driving gear 36 by plural gears in the transmission gear mechanism, to collapse the movable lens barrel 9. The ring-shaped gear 39 is rotated by the gear 49 in the counterclockwise direction. The transmission ring 40 rotates in the same direction as the first and second pressing projections 39b and 39c push the first and second engaging ridges 40b and 40c. The contact projection 40d pushes the lever end arm 42a of the first shift lever 42, which is rotated in the clockwise direction. The first shift lever 42 causes the lever biasing spring 44 to rotate the second shift lever 43 in the counterclockwise direction. The engaging end arm 43c pushes the lever projection 52a of the flash emitting unit 48. In FIG. 14, the flash emitting unit 48 rotationally shifts to the contained position.

To contain the flash emitting unit 48, high force is required because of a direction of the force against the bias of the tension coil spring 41, the lever biasing spring 44 and the flash flip-up spring 54. However, the ratio of the speed reduction can be very great owing to the ring-shaped gear 39. It is possible to rotate the flash emitting unit 48 smoothly and lightly. The ring-shaped gear 39 and the transmission ring 40 rotate only at a small amount in the course of moving of the movable lens barrel 9 between the collapsed position and the wide-angle end position. However, a great stroke on the outer periphery can be obtained by means of the considerably great diameter of the ring-shaped gear 39 and the transmission ring 40. The flash emitting unit 48 can be linked with high reliability.

For transmission between the transmission ring 40 and the flip-up flash device 12, the first and second shift levers 42 and 43 are used and disposed on the upper and front panels of the camera 2. This is effective in economizing the space for containing, and reducing the size of the entirety of the camera 2. Furthermore, the lever biasing spring 44 with a low cost is used for connection between the first and second shift levers 42 and 43. It is possible to contain a tension coil spring as the lever biasing spring 44 in a considerably small space in comparison with a space which would contain a toggle spring or the like. A manufacturing cost can be reduced remarkably.

The motor 37 stops rotating upon the completion of collapsing of the movable lens barrel 9 and the containing of the flash emitting unit 48. In FIG. 8, the locking projection 34 moves away from the rear of the cover stopper 30. The slidable cover 19 is released from blocking of the cover stopper 30. When the slidable cover 19 is slid to the closed position, the cover stopper 30 is pushed by the rear pressing portion 19c of the slidable cover 19, and rotates to the releasing position. In FIG. 9, the second inclined face 30e pushes the first inclined face 34a of the locking projection 34. In FIG. 11, the transmission ring 40 is caused to make a counterclockwise rotation. Therefore, the load of the tension coil spring 41, the lever biasing spring 44 and the flash flip-up spring 54 becomes applied to the cover stopper 30 in place of the ring-shaped gear 39.

In the above embodiment, the ring-shaped gear 39 is disposed in front of the transmission ring 40. However, the ring-shaped gear 39 may be disposed behind the transmission ring 40.

In the above embodiment, the flash built-in camera of the invention is a photographic camera for use with silver halide photographic film. Furthermore, a camera of the invention can be a digital still camera, a digital video camera, or other optical instrument provided with a flip-up flash device.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera comprising:
   a movable lens barrel, movable between a collapsed position of being contained inside a camera body, and at least one photographing position determined in front of said collapsed position, for holding a taking lens;
   a slidable cover, movable between a closed position and an open position, for covering a front of said movable lens barrel in said collapsed position when in said closed position, and for uncovering said front of said movable lens barrel when in said open position;
   a cover stopper, movable between a stopping position and a releasing position, for retaining said slidable cover in said open position when in said stopping position, and for moving back from said stopping position to said releasing position when said slidable cover moves from said open position to said closed position;
   a locking mechanism, responsive to moving of said movable lens barrel, for retaining said cover stopper in said stopping position when said movable lens barrel is in said photographing position, and for allowing said cover stopper to move from said stopping position to said releasing position when said movable lens barrel is in said collapsed position.

2. A camera as defined in claim 1, further comprising a biasing mechanism for biasing said cover stopper to said stopping position, wherein said slidable cover includes an engageable portion formed with a surface thereof, and said biasing mechanism moves said cover stopper to said stopping position when said slidable cover is set in said open position, to engage said engageable portion with a distal end of said cover stopper.

3. A camera as defined in claim 2, wherein said cover stopper is disposed in said camera body and in a rotatable manner on a plane extending across a moving direction of said slidable cover, and an opening is formed in said slidable cover, for allowing engagement of said distal end with said engageable portion.

4. A camera as defined in claim 3, wherein said engageable portion comprises a locking recess.

5. A camera as defined in claim 3, wherein said locking mechanism includes:
   a ring-shaped member for rotating according to movement of said movable lens barrel; and
   a projection, formed on said ring-shaped member, for being set behind said cover stopper when said movable lens barrel is set in said photographing position, to block rotation of said cover stopper from said stopping position to said releasing position, and for being set away from said cover stopper when said movable lens barrel is set in substantially in said collapsed position, to cause said cover stopper to move from said stopping position to said releasing position forcibly by movement of said slidable cover to said closed position.

6. A camera as defined in claim 5, further comprising:
   a switch for changing over from a first state to a second state upon movement of said slidable cover to said open position;
   a motor for rotating forwards upon a change of said switch from said first state to said second state, and for rotating backwards upon a change of said switch from said second state to said first state;
   a transmission gear mechanism for transmitting rotation of said motor to said movable lens barrel, to move said movable lens barrel from said collapsed position to said photographing position when said motor rotates forwards, and to move said movable lens barrel from said photographing position to said collapsed position when said motor rotates backwards.

7. A camera as defined in claim 6, wherein said ring-shaped member is rotated by said transmission gear mechanism.

8. A camera as defined in claim 7, further comprising a stationary barrel, formed to project forwards from said camera body, for supporting said movable lens barrel movably in forward and backward directions;
   wherein said ring-shaped member is secured to an outer surface of said stationary barrel in a rotatable manner.

9. A camera as defined in claim 8, further comprising a front cover, secured to a front of said camera body, and a slide supporting mechanism, having at least one straight portion, for securing said slidable cover to said front cover in a slidable manner.

10. A camera as defined in claim 9, wherein said slide supporting mechanism includes:
    a projection formed to project from said slidable cover; and
    a rail groove, formed in said front cover, for receiving said projection, to keep said slidable cover slidable.

* * * * *